United States Patent
Shiga

(10) Patent No.: US 8,736,976 B2
(45) Date of Patent: May 27, 2014

(54) OSCILLATION MOTOR AND LENS DRIVING MECHANISM

(75) Inventor: Naoto Shiga, Saitama (JP)

(73) Assignee: Tamron Co., Ltd., Saitama (JP)

( * ) Notice: Subject to any disclaimer, the term of this patent is extended or adjusted under 35 U.S.C. 154(b) by 108 days.

(21) Appl. No.: 13/307,821

(22) Filed: Nov. 30, 2011

(65) Prior Publication Data

US 2012/0140347 A1 Jun. 7, 2012

(30) Foreign Application Priority Data

Dec. 6, 2010 (JP) ................................ 2010-271390

(51) Int. Cl.
  *G02B 15/14* (2006.01)
  *G02B 7/02* (2006.01)
  *H02K 33/00* (2006.01)
(52) U.S. Cl.
  USPC ........... 359/696; 359/814; 359/823; 359/824; 310/38; 310/328
(58) Field of Classification Search
  USPC ............. 359/694–701, 822–824, 843, 872; 123/18 A; 451/28, 49, 163, 363; 310/38, 311, 323.16, 323.17; 74/422; 290/53; 15/250.21, 250.27, 202.202, 15/250.352; 12/8.3; 369/263.1; 69/6.5
  See application file for complete search history.

(56) References Cited

U.S. PATENT DOCUMENTS

| | | | | |
|---|---|---|---|---|
| 3,445,872 A | * | 5/1969 | Pisaroni | ............................ 12/8.3 |
| 4,324,118 A | * | 4/1982 | Bruggi | .............................. 69/6.5 |
| 5,325,562 A | * | 7/1994 | Journee | ..................... 15/250.202 |
| 7,109,638 B2 | * | 9/2006 | Kitahara et al. | ......... 310/323.16 |
| 7,119,476 B2 | * | 10/2006 | Nagahama | ..................... 310/317 |
| 7,794,306 B2 | * | 9/2010 | Kondo et al. | .................... 451/49 |
| 8,493,675 B2 | * | 7/2013 | Shiga | ............................ 359/814 |
| 2011/0317293 A1 | | 12/2011 | Shiga | |
| 2012/0200197 A1 | * | 8/2012 | Shiga | ........................... 310/328 |

FOREIGN PATENT DOCUMENTS

| | | |
|---|---|---|
| JP | 05-033690 | 2/1993 |
| JP | 10-036679 | 2/1998 |
| JP | 4182588 B2 | 11/2008 |
| JP | 2010206907 A | 9/2010 |
| WO | 2010101139 A1 | 9/2010 |

* cited by examiner

*Primary Examiner* — Loha Ben
(74) *Attorney, Agent, or Firm* — The Webb Law Firm

(57) ABSTRACT

An oscillation motor is adapted to press an oscillator toward a driven body in a stable state and increasing a drive efficiency. A lens driving mechanism is adapted to move a lens with excellent efficiency by using the oscillation motor. An oscillation motor generates motive power by pressure contact with a driven body to transmit vibration of the oscillator to the driven body. The oscillation motor includes the oscillator having a convex output portion on a side surface at one end side. The output portion of the oscillator is arranged to contact with the driven body. A press mechanism is also provided on a side surface at the other end side of the oscillator. The press mechanism includes a pressure correction device rotatably equipped at a position where the pressure correction device contacts with the oscillator, and the pressure correction device applies a pressure to the oscillator in a predetermined direction.

7 Claims, 3 Drawing Sheets

OSCILLATION MOTOR AND LENS DRIVING MECHANISM

BACKGROUND OF THE INVENTION

1. Field of the Invention

The present invention relates to an oscillation motor which generates a motive power by making an oscillator oscillate and the oscillation is transmitted to a driven body in pressure contact with the oscillator, and a lens driving mechanism that makes the lens move along an optical axis direction by using the oscillation motor.

2. Background Art

An oscillation motor is one of driving device for various equipments provided with a movable mechanism. In the oscillation motor, an oscillator including an output portion is made oscillate at the output portion to generate a rotating motion, such as an elliptic motion, and the output portion pressure contact with a driven body transmits power to the driven body by a frictional force between the output portion and the driven body. Among the oscillation motors, an ultrasonic motor can achieve high torque in low rotation and has features, excellent silence and suitability for miniaturization and weight reduction. For example, the ultrasonic motor is used as a motive power device for a movable mechanism that requires precise positioning in the equipment, such as an auto-focusing function of a camera or a scanning electron microscope or the like.

Japanese Patent No. 4182588 discloses an oscillation motor for use in an optical system driving equipments. The present applicant has proposed an oscillation motor unit disclosed in Japanese Patent Laid-Open No. 2010-206907 in which area for installing an oscillation motor is reduced to contribute miniaturization. As disclosed in Japanese Patent No. 4182588 and Japanese Patent Laid-Open No. 2010-206907, it is necessary to equip an oscillation motor and a motive power transmitting mechanism in a limited space when the oscillation motor is used for an optical system driving device, such as a camera. Thus, an oscillation motor excellent in miniaturization and driving efficiency has been investigated.

FIG. 5 illustrates a relation between an oscillator and a driven body in an oscillation motor. As demonstrated in FIG. 5, to transmit a rotational motion generated at an output portion 101 included in an oscillator 100 to a driven body 200, it is necessary to make the output portion 101 pressure contact with the driven body 200 in the oscillation motor. Then, the oscillation motor includes a press mechanism for pressing the oscillator 100 to the driven body 200. The press mechanism presses the oscillator 100 from a side surface 103 opposite to a side surface 102 where the output portion 101 of the oscillator 100 is equipped to make the oscillator 100 pressure contact to the driven body 200. To achieve stable transmission of a rotational motion to the driven body 200, it is preferable that a pressing force is provided from a direction indicated by the arrow in FIG. 5 on the same line as a connecting portion between the driven body 200 and the output portion 101.

However, when the oscillation motor is used as a lens driving mechanism, the installation space is limited to make it difficult to equip the press mechanism on the same line as the connecting portion between the driven body 200 and the output portion 101 in series. Thus, in the pressing member disclosed in Japanese Patent No. 4182588, a press force transmitting member which is bent substantially along the outer edge of an opening formed in a base member is used. Further, in the press mechanism disclosed in Japanese Patent Laid-Open No. 2010-206907, a mechanism in which an oscillator is arranged on a first surface of a base member and the press mechanism is arranged on a second surface of the base member is employed to transmit a press force from the press mechanism through a press guide.

Since the oscillator is made oscillate in the oscillation motor, a contact state between a press portion for pressing the oscillator by the press mechanism and the oscillator tends to fluctuate due to the operation. In particular, in a lens driving mechanism or the like, when the limitations of the installation space make it difficult to equip the press mechanism on the same line as the connecting portion between the driven body 200 and the output portion 101 in series, the pressing force from the press mechanism tends to be unstable.

Next, in the ultrasonic motor, a piezoelectric element used as an oscillator has a hysteresis between an applied voltage and a transition amount. Thus, an intended positional relation between the press mechanism and the oscillator in operation may be slightly deviated from that in a static condition. As a result, a pressure on the oscillator from the press mechanism is dispersed and it makes optimum pressing hard and it results deterioration in drive efficiency. Thus, a further improvement has been demanded.

Therefore, an object of the present invention was set to provide an oscillation motor capable of pressing an oscillator toward a driven body in a stable state to increase drive efficiency, and a lens driving mechanism capable to move a lens with excellent efficiency by using the oscillation motor.

SUMMARY OF THE INVENTION

As a result of intensive study, the inventors of the present invention have achieved the above-mentioned object of the present invention by employing an oscillation motor and a lens driving mechanism described later. The present invention will be demonstrated below.

An oscillation motor according to the present invention is the oscillation motor which generates a motive power by making an oscillator oscillate and the oscillation is transmitted to a driven body in pressure contact with the oscillator, the oscillation motor is characterized in comprising the oscillator provided with a convex output portion on a side surface at one end side and the output portion is made contact with the driven body, and a press mechanism that presses the oscillator toward the driven body on a side surface at the other end side of the oscillator, wherein the press mechanism comprises a pressure correction device rotatably provided at a position where the pressure correction device contact to the oscillator and the press mechanism applies a pressure to the oscillator at a predetermined direction via the pressure correction device.

In the oscillation motor according to the present invention, it is preferable that the press mechanism further include a press device and a pressure transmitting device that transmits a pressing force from the press device to the oscillator, the pressure correction device comprises a planar portion in contact with the side surface at the other end side of the oscillator and a connecting portion that is rotatably geared with the pressure transmitting device, and the pressure correction device corrects an direction of a pressing force from the pressure transmitting device and presses the oscillator in a predetermined direction at the connecting portion.

In the oscillation motor according to the present invention, it is preferable that the pressure correction device has a circular outer peripheral surface at the connecting portion, the pressure transmitting device comprises a circular notch portion formed along the shape of the circular outer peripheral surface of the pressure correction device, and the pressure correction device is geared with the pressure transmitting device in a state where the circular outer peripheral surface at the connecting portion of the pressure correction device and the notch portion of the pressure transmitting device are geared each other to make the pressure correction device rotatable.

In the oscillation motor according to the present invention, it is preferable that the connecting portion of the pressure correction device is formed into a groove shape corresponding to the notch portion of the pressure transmitting device, and the notch portion of the pressure transmitting device is arranged inserted in the groove-shaped connecting portion and is geared with the connecting portion.

In the oscillation motor according to the present invention, it is preferable that the pressure correction device is made of engineering plastic.

In the oscillation motor according to the present invention, it is preferable that the engineering plastic is one of a liquid crystal polymer and a polyether ketone.

A lens driving mechanism comprising the oscillation motor according to the present invention is characterized in that the oscillation motor is provided on an outer peripheral side of a lens as a motive power device for moving the lens along an optical axis direction.

In the oscillation motor according to the present invention, direction of the pressing force from the press mechanism to the oscillator can be adjusted to the predetermined direction because the press mechanism which makes the output portion of the oscillator pressure contact to the driven body includes the pressure correction device. As a result, pressure from the oscillator toward the driven body is stabilized and a transmitting failure of a motive power can be reduced. In particular, even when the press device cannot be arranged along the same line as the connecting portion between the driven body and the output portion of the oscillator, the pressing is made possible at the predetermined direction, and the oscillation motor can achieve a stable motive power transmitting. Furthermore, in the lens driving mechanism according to the present invention, the lens can be made move with a stable motive power by arranging such an oscillation motor on an outer peripheral side of a lens.

DETAILED DESCRIPTION OF THE PREFERABLE EMBODIMENTS

Hereinafter, preferable embodiments of an oscillation motor and a lens driving mechanism according to the present invention will be demonstrated.

Figure 1:
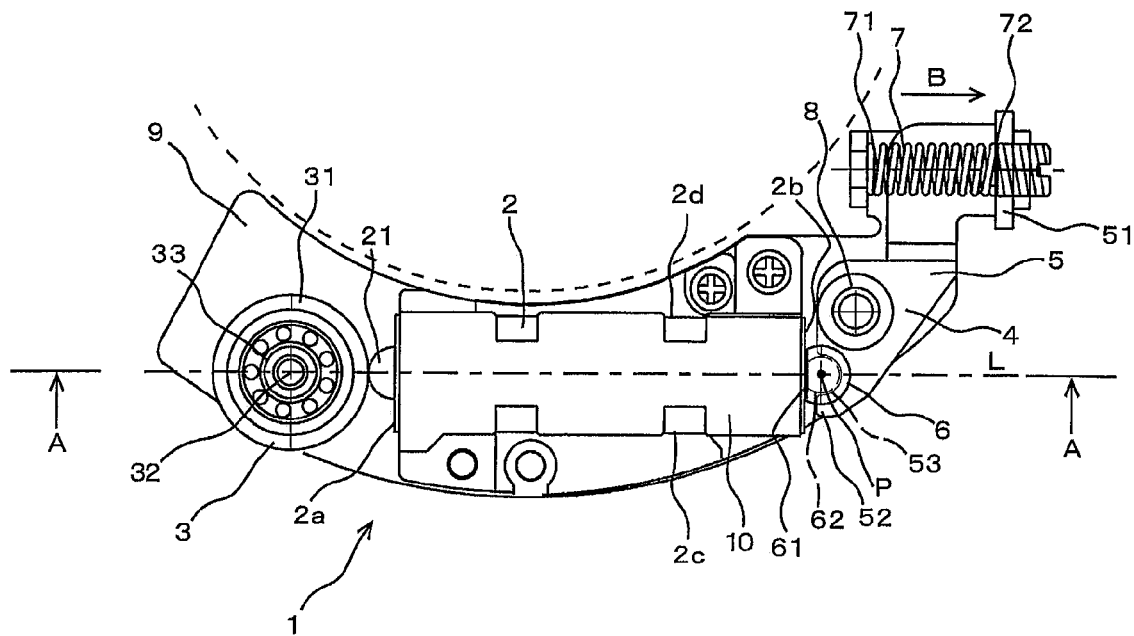
FIG. 1 is a plan view illustrating an embodiment of an oscillation motor according to the present invention.
Figure 2:
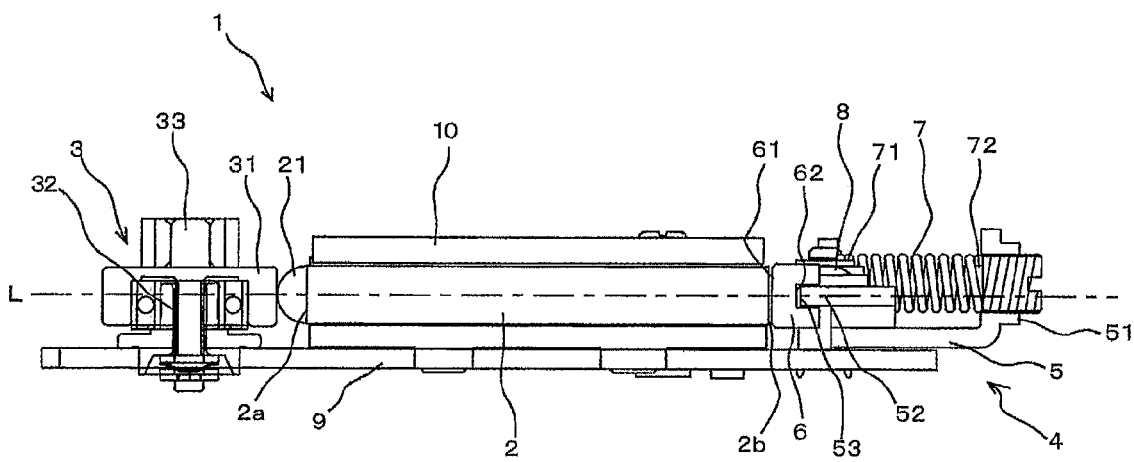
FIG. 2 is a side view including cross sectional view along the line A-A in FIG. 1.

An oscillation motor according to the present invention includes an oscillator and a press mechanism. In the oscillation motor, the oscillator oscillating is in pressure contact with a driven body and transmits oscillation of the oscillator toward the driven body to generate a motive power. FIG. 1 is a plan view illustrating the example in which an oscillation motor according to the present invention as a drive mechanism for driving an imaging lens is arranged on an outer peripheral side of a lens. FIG. 2 is a side view including cross sectional view along the line A-A in FIG. 1. As illustrated in FIGS. 1 and 2, the oscillator 2 constituting the oscillation motor 1 is arranged at a position where the output portion 21 provided on the side surface 2a at one end of the oscillator 2 in contact to the driven body 3 and the press mechanism 4 is arranged in contact to the side surface 2b at the other end of the oscillator 2. The driven body 3 and the press mechanism 4 are equipped to the base member 9 independently and the oscillator 2 is held in the oscillator holder 10 which is equipped to the base member 9.

The driven body 3 is a movable member which is driven according to a motion transmitted from the output portion 21 of the oscillator 2. In the example illustrated in FIGS. 1 and 2, a motive power transmitting portion 31 having a substantially cylindrical outer shape is attached to the base members 9 in the state rotatable along a dead spindle 32. When the output portion 21 of the oscillator 2 is made pressure contact to the motive power transmitting portion 31 and the output portion 21 performs a predetermined motion, the motive power transmitting portion 31 starts to rotate by a frictional force between the output portion 21 and the motive power transmitting portion 31. A lens driving mechanism (not shown) is connected to a motive power output portion 33 which rotates synchronized with the motive power transmitting portion 31 and function as a motive power device for the lens driving mechanism. Note that the driven body 3 may be a driven target the oscillation motor 1 directly drive, or may be an indirect member which transmits a motive power to the driven target.

In this embodiment, an oscillator having a rectangular parallelepiped shape and formed of a piezoelectric element is used as the oscillator 2. Next, the oscillator 2 includes the convex output portion 21 on the side surface 2a at one side of the oscillator 2. The output portion 21 is made contact to the driven body 3. In the oscillation motor using a piezoelectric element, to converted the vibration generated into a predetermined regular motion in the output portion 21, the shape of the piezoelectric element, the location where voltage is applied, the amount or cycle of the applied voltage, and the like in the piezoelectric element are adjusted. In this embodiment, the output point 21 was arranged to generate an elliptical rotational motion.

The oscillator holder 10 holds the oscillator 2 in the state where the oscillator can oscillate therein. The oscillator 2 is held in the oscillator holder 10 in the state where the side surface 2a at the side of the output portion 21 and the side surface 2b at the other side of the side surface 2a are exposed. In this embodiment, the oscillator 2 is held on the side surfaces 2c and 2d in the length direction of the oscillator 2 and at several positions on the top and bottom surfaces. As illustrated in FIG. 1, the oscillator 2 is held in the oscillator holder 10 in the state where the output portion 21 contact to the outer peripheral surface of the motive power transmitting portion 31 of the driven body 3 on a virtual line L which passes through the center of the dead spindle 32 of the driven body 3. Hereinafter, the virtual line L passing through the center of the dead spindle 32 of the driven body 3 is referred to as a reference line L for use in transmitting a motive power from the oscillator 2 to the driven body 3.

Next, the press mechanism 4 presses the oscillator 2 to the driven body 3 on the side surface 2b at the other end of the oscillator 2. In this embodiment, as illustrated in FIGS. 1 and 2, the press mechanism 4 comprises a press device 7, a pressure transmitting device 5, and a pressure correction device 6, and is arranged at the side surface 2b on the other side of the output portion 21 of the oscillator 2. The press device 7 is constituted with a spring coil, and is arranged at a position apart from the oscillator 2 where the expansion/contraction direction of the coil spring becomes parallel to the reference line L. Then, one end 71 of the press device 7 is fixed to the base member 9, and the other end 72 of the press device 7 is connected to the pressure transmitting device 5.

The pressure transmitting device 5 constituting the press mechanism 4 is a member which transmits a pressure from the press device 7 to the side of the oscillator 2. In this embodiment, the pressure transmitting device 5 is an arm-shaped member equipped to the base member 9 via a spindle 8 and is rotatable around the spindle 8. In the pressure transmitting device 5 connected to the press device 7 at a press device connecting portion 51, a force applied on the press device connecting portion 51 in a direction indicated by the arrow "B" makes the press device connecting portion 51 rotate around the spindle 8, i.e. a force is applied in a direction which makes an output end 52 where a pressure is applied approach to the oscillator 2. As a result, a force that presses the oscillator 2 against the driven body 3 is generated in the press mechanism 4.

The press mechanism 4 also includes the pressure correction device 6 which is rotatably equipped at a position where the pressure correction device 6 made contact with the oscillator 2. As illustrated in FIGS. 1 and 2, the pressure correction device 6 includes a planar portion 61 made contact with the side surface 2b at the other end of the oscillator 2, and a connecting portion 62 rotatably geared with the pressure transmitting device 5. In the oscillation motor according to the present invention, as the rotatable pressure correction device 6 is arranged between the pressure transmitting device 5 and the side surface 2b of the oscillator 2, an direction of a pressing force of the pressure transmitting device 5 is corrected with respect to the side surface 2b of the oscillator 2 to apply a pressure to the oscillator 2 at a predetermined direction. As a result, the oscillator 2 is made pressure contact with the driven body 3 at an appropriate direction. Additionally, a buffer effect can be obtained even the force generated between the pressure transmitting device 5 and the oscillator 2 fluctuates.

In the pressure correction device 6, at least the planar portion 61 is made contact with the side surface 2b at the other end side of the oscillator 2 and is rotatably geared with the pressure transmitting device 5. For example, a structure in which the pressure correction device is rotatably equipped through a shaft (not shown) going through in the thickness direction of the pressure transmitting device 5 may be employed. As another example, a structure may be employed in which the pressure correction device is shaped to be a sphere in which a part of a sphere is cut in a plane surface parallel to the tangential line; a notch portion 53 of the pressure transmitting device 5 is shaped along a spherical surface of the pressure correction device; the pressure correction device is arranged in the notch portion 53 and the pressure correction device is sandwiched between the pressure transmitting device 5 and the oscillator 2. Particularly, as illustrated in FIGS. 3a and 3b, when a structure is constituted with the pressure transmitting device 5 having a circular notch portion 53 made contact with the pressure correction device 6 of which connecting portion 62 has a circular outer peripheral surface 64 and are geared together, such a simple structure makes attachment work easy and a press force can be stably transmitted.

Figure 3:
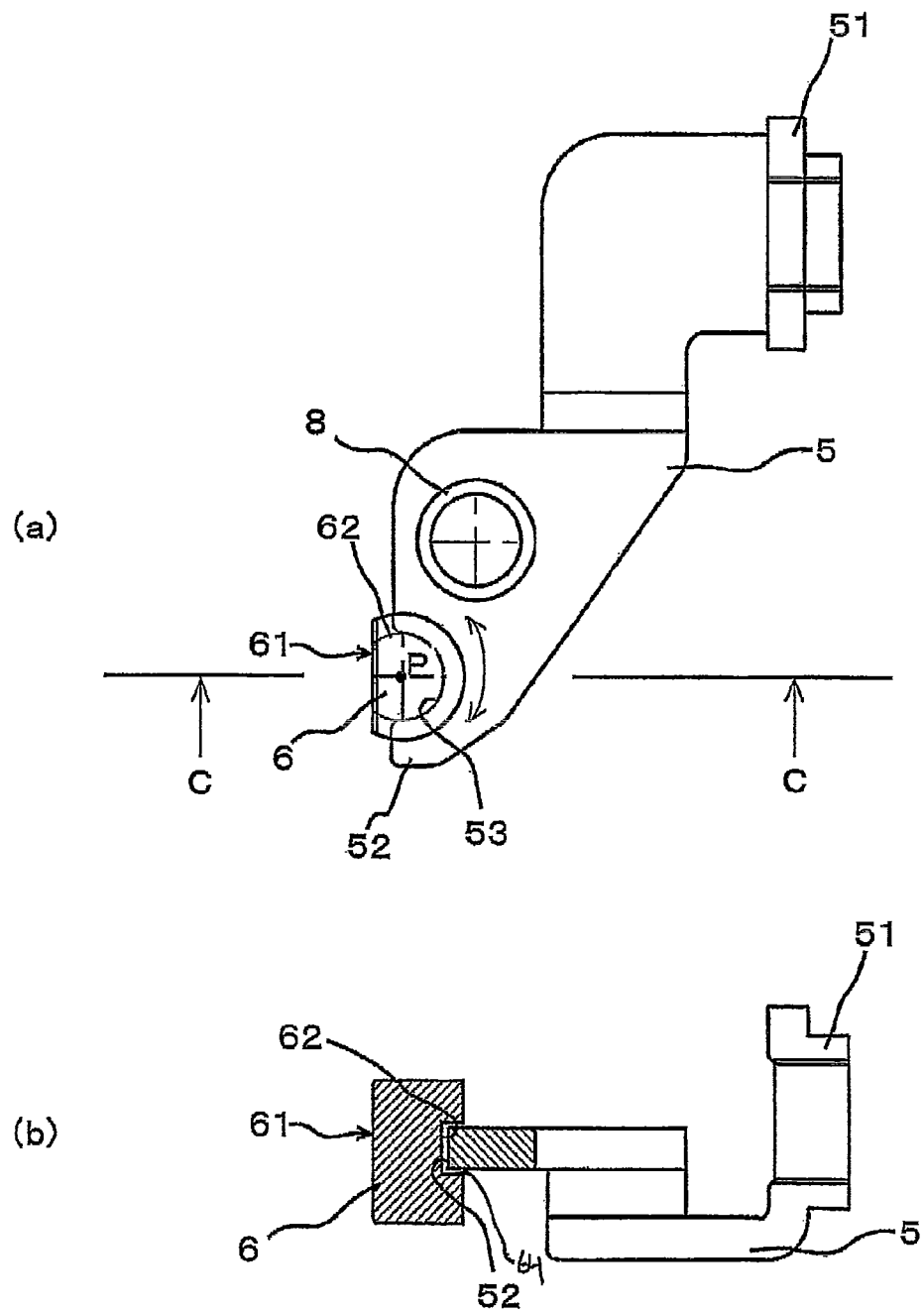
FIGS. 3(a) and 3(b) are cross sectional views illustrating a connecting portion between a pressure correction device and a pressure transmitting device.

FIGS. 3a and 3b are schematic views illustrating an example arrangement of the press transmitting potion 5 and the pressure correction device 6 equipped in the press mechanism 4. FIG. 3a is a plan view, and FIG. 3b is a side view including cross sectional view along the line C-C in FIG. 3a. In this embodiment, the pressure correction device 6 has such a shape as a partially cut pulley, for example. Specifically, the pressure correction device 6 has a shape in which a part of a circle is cut in a plane parallel to the tangential line in a plan view as illustrated in FIG. 3a, and as illustrated in FIG. 3b, a thickness of the pressure correction device 6 is greater than that of the pressure transmitting device 5 and a groove portion 62 is formed on a circular outer peripheral surface 64 to which the pressure transmitting device 5 should be inserted. The groove portion 62 is the connecting portion of the pressure correction device 6. The pressure transmitting device 5 has the notch portion 53 formed along the shape of the connecting portion 62 having the circular outer peripheral shape of the pressure correction device 6. The pressure correction device 6 is arranged so that the notch portion 53 is inserted into the groove portion serving as the connecting portion 62 of the pressure correction device 6. In this case, the pressure correction device 6 is arranged to be sandwiched between the pressure transmitting device 5 and the side surface 2b of the oscillator 2. Such construction does not need deep gearing between the pressure transmitting device 5 and the pressure correction device 6. Instead, shallower the groove formed in the connecting portion 62 of the pressure correction device 6 is, smaller the contact area between the pressure correction device 6 and the pressure transmitting device 5 and it can make the friction in rotation minimum.

Figure 4:
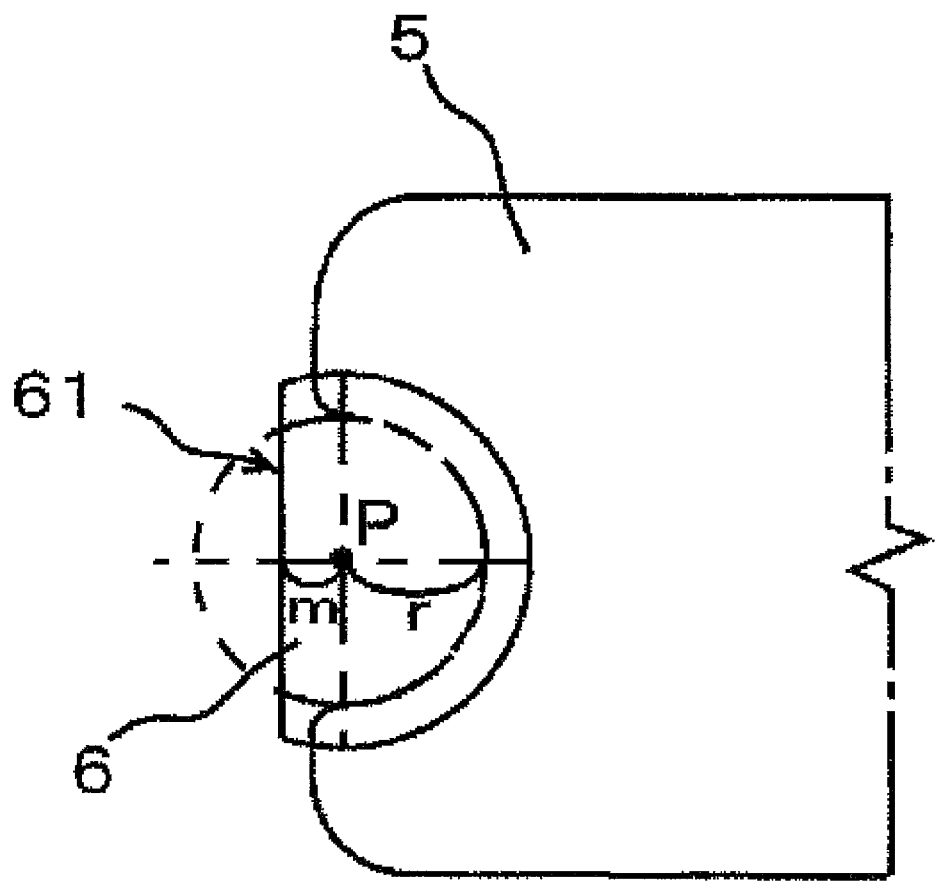
FIG. 4 is a partial plan view illustrating exemplary structures of the pressure transmitting device and the pressure correction device in a press mechanism.
Figure 5:
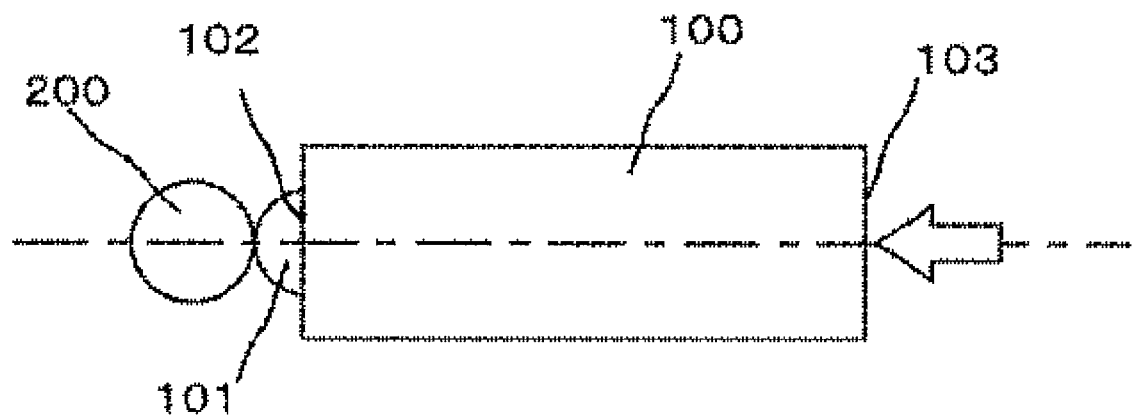
FIG. 5 is an explanatory diagram illustrating an example in which an oscillator and a driven body are equipped.

In this manner, when the pressure correction device 6 has a shape in which a part of a sphere is cut in a plane parallel to the tangential line in a plan view, a press direction can be stably corrected. Further, as illustrated in FIG. 3a, when the pressure correction device 6 is designed to have an area wider than a semicircle and a center point P (rotation center) of an intended circle falls within the notch portion 53 of the pressure transmitting device 5, the pressure correction device 6 can stably rotate and a press direction of the press mechanism 4 pressing the oscillator 2 can be stabilized. Furthermore, with regard to a shape of the pressure correction device 6, a circle is cut in a plane parallel to the tangential line of the intended circle at a position where a distance "m" from the center "P" of the intended circle having a radius "r" corresponding to the size of the connecting portion at the circular outer peripheral surface 64 to the planar portion 61 is expressed as m/r=0 to 0.95 in a plan view as illustrated in FIG. 4, the enough contact surface to the oscillator 2 can be assured with stable rotation, and the pressure from the press mechanism 4 can be suitably applied to the oscillator 2.

Moreover, the pressure correction device 6 is preferable to be made of engineering plastic. When engineering plastic is employed as the material for the pressure correction device 6, the contact state between the oscillator 2 and the planar portion 61 of the pressure correction device 6 is improved and reduction of backlash in an operation can be achieved. In particular, when the engineering plastic is a liquid crystal polymer or a polyether ketone, the stability is excellent in the operation.

With regard to the oscillation motor according to the present invention, the press mechanism can be arranged in series on the reference line L in addition to the illustrated examples. In general, when the press mechanism 4 is arranged to apply a pressure to the side surface 2b at the other end side of the oscillator 2 in vertical direction, the press mechanism 4 hardly provide constant pressing force because the oscillator 2 oscillates during the time when the oscillation motor 1 is in operation. However in such case, in the oscillation motor according to the present invention including the pressure correction device 6, the pressing force can be stably transmitted.

Next, a lens driving mechanism according to the present invention will be demonstrated. The lens driving mechanism according to the present invention includes the oscillation motor 1 described above on an outer peripheral side of a lens as illustrated in FIG. 1, as a motive power device for moving the lens in an optical axis direction. In the case where the lens driving mechanism is equipped on the outer peripheral side of the lens, it is difficult to dispose the press mechanism 4 in series on the reference line L between the oscillator 2 and the driven body 3. However, the oscillation motor 1 according to the present invention makes it possible to stably transmit a press force from the pressure transmitting device 5. Consequently, even the oscillation motor is provided in a limited installation space, driving efficiency can be improved because motive power transmission is not lost.

An oscillation motor according to the present invention can stably press an oscillator toward a driven body even in a limited installation space. Therefore, the oscillation motor can be utilized as the oscillation motor as a motive power device for a small movable mechanism as well as the above-mentioned lens driving mechanism.

The invention claimed is:

1. An oscillation motor which generates a motive power by making an oscillator oscillate, wherein an oscillation of the motor is transmitted to a driven body in pressure contact with the oscillator, the oscillation motor comprising:
   the oscillator comprising a convex output portion on a side surface at one end side thereof, the output portion being equipped in contact with the driven body; and
   a press mechanism that presses the oscillator toward the driven body on a side surface at the other end side of the oscillator,
   wherein the press mechanism comprises a pressure correction device rotatably provided at a position where the pressure correction device is in contact with the oscillator, and
   wherein the press mechanism applies a pressure to the oscillator via the pressure correction device in a predetermined direction.

2. The oscillation motor according to claim 1, wherein:
   the press mechanism further includes a press device and a pressure transmitting device that transmits a pressing force from the press device to the oscillator,
   the pressure correction device comprises: a planar portion in contact with the side surface at the other end side of the oscillator; and a connecting portion that rotatably connects to the pressure transmitting device, and
   the pressure correction device corrects a direction of a pressing force from the pressure transmitting device and presses the oscillator in a predetermined direction at the connecting portion.

3. The oscillation motor according to claim 2, wherein:
   the pressure correction device has a circular outer peripheral surface in the connecting portion,
   the pressure transmitting device comprises a circular notch portion formed along the shape of the circular outer peripheral surface of the pressure correction device, and
   the pressure correction device connects to the pressure transmitting device in a state where the circular outer peripheral surface in the connecting portion of the pressure correction device and the notch portion of the pressure transmitting device connect to each other to make the pressure correction device rotatable.

4. The oscillation motor according to claim 3, wherein: the connecting portion of the pressure correction device is formed into a groove shape corresponding to the notch portion of the pressure transmitting device, and the notch portion of the pressure transmitting device is inserted and arranged in the groove-shaped connecting portion and connects to the connecting portion.

5. The oscillation motor according to claim 1, wherein the pressure correction device is made of engineering plastic.

6. The oscillation motor according to claim 5, wherein the engineering plastic is one of a liquid crystal polymer and a polyether ketone.

7. A lens driving mechanism comprising the oscillation motor according to claim 1, wherein the oscillation motor is provided on an outer peripheral side of a lens as a motive power device for moving the lens along an optical axis direction.

* * * * *